(12) United States Patent
Schmitt et al.

(10) Patent No.: US 10,082,382 B2
(45) Date of Patent: Sep. 25, 2018

(54) PHASING AN OPTICAL INTERFEROMETER USING THE RADIO EMISSION FROM THE TARGET BEING OBSERVED

(71) Applicant: The United States of America, as represented by the Secretary of the Navy, Washington, DC (US)

(72) Inventors: Henrique Schmitt, Greenbelt, MD (US); David Mozurkewich, Seabrook, MD (US); John Thomas Armstrong, Silver Spring, MD (US); Sergio R. Restaino, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/447,812

(22) Filed: Mar. 2, 2017

(65) Prior Publication Data
US 2017/0307351 A1   Oct. 26, 2017

Related U.S. Application Data

(60) Provisional application No. 62/302,846, filed on Mar. 3, 2016.

(51) Int. Cl.
*G01B 9/02* (2006.01)
*G01S 3/14* (2006.01)
(Continued)

(52) U.S. Cl.
CPC .......... *G01B 9/02019* (2013.01); *G01S 3/14* (2013.01); *G02B 5/00* (2013.01); *G01B 2290/10* (2013.01); *G01S 3/48* (2013.01)

(58) Field of Classification Search
CPC .... G01B 9/02019; G01B 2290/10; G01S 3/14
See application file for complete search history.

(56) References Cited

U.S. PATENT DOCUMENTS

2017/0199077 A1* 7/2017 Capron .................. G01J 1/44

OTHER PUBLICATIONS

Armstrong, J. Thomas, Mozurkewich, David, Pauls, Thomas A. and Hajian, Arsen R., Bootstrapping the NPOI: keeping long baselines in phase by tracking fringes on short baselines, Proceedings of SPIE, 1998.

(Continued)

*Primary Examiner* — Hwa Lee
(74) *Attorney, Agent, or Firm* — US Naval Research Laboratory; Scott G. Bell (57) ABSTRACT

An interferometry system including a first telescope for simultaneously receiving a first optical/infrared signal and a first radio signal from a target; a second telescope configured to simultaneously receive a second optical/infrared signal and a second radio signal from the target; a first beam splitter communicatively connected to the first telescope, where the first beam splitter is configured to separate the first optical/infrared signal from the first radio signal; a second beam splitter communicatively connected to the second telescope, where the second beam splitter is configured to separate the second optical/infrared signal from the second radio; and a first optical/infrared interferometer configured to detect an interferometry image of the target using the first and second optical/infrared and radio signals.

15 Claims, 4 Drawing Sheets

(51) Int. Cl.
*G02B 5/00* (2006.01)
*G01S 3/48* (2006.01)

(56) References Cited

OTHER PUBLICATIONS

Colavita, M. Mark, Swain, Mark R., Akeson, Rachel L., Koresko, Christopher D., and Hill, Reginald J., Effects of Atmospheric Water Vapor on Infrared Interferometry, The Astronomical Society of the Pacific, vol. 116, pp. 876-885, 2004.
Helmboldt, J.F., Lazio, T.J.W., Intema, H.T., and Dymond, K.F., High-precision Measurements of Ionospheric TEC Gradients with the Very Large Array VHF System, American Geophysical Union, pp. 1-23, 2014.
Rueger, Jean M., Refractive Index Formulae for Radio Waves, Integration of Techniques and Corrections to Achieve Engineering, pp. 1-13, 2002.
Lawson, Peter R., Principles of Long Baselines Stellar Interferometry, JPL Publication 00-009 07/00, Course Notes from the 1999 Michelson Summer School, pp. 1-88, 1999.
Stewart, Ken, Electromagnetic Performance of a Wire Grid Ground Screen, U.S. Naval Research Laboratory, Memo, www.ece.vt.edu/swe/lwa/memo/lwa0083.pdf, 2007.

* cited by examiner

PHASING AN OPTICAL INTERFEROMETER USING THE RADIO EMISSION FROM THE TARGET BEING OBSERVED

CROSS REFERENCE TO RELATED APPLICATION

This application claims the benefit of U.S. Provisional Patent Application No. 62/302,846 filed on Mar. 3, 2016, the contents of which, in its entirety, is herein incorporated by reference.

GOVERNMENT INTEREST

The embodiments herein were made by employees of the United States Government and may be manufactured, used, and/or licensed by or for the United States Government without the payment of royalties thereon.

BACKGROUND

Technical Field

The embodiments herein generally relate to target detection and characterization, and more particularly to using any of optical and infrared interferometry for target detection and characterization.

Description of the Related Art

It is desirable to observe and image geostationary satellites (geosats) from the ground. This capability would serve multiple purposes, such as surveillance, detection of companion satellites, and monitoring the health of these highly-valued assets. Geosats orbit at altitudes of approximately 36,000 km and have overall dimensions ranging from 1 to 50 m, corresponding to angular sizes of approximately 0.03 to 1.39 milliradian, or 6 to 280 milli-arcseconds (mas) as seen from the ground. However, the largest ground-based optical telescopes generally cannot reach resolutions better than approximately 50 mas.

Optical or infrared interferometry may be used for the detection and characterization of astronomical targets, achieving resolutions significantly higher than that possible with a single telescope. Optical or infrared interferometry achieves this resolution by coherently combining light from two or more telescopes separated by distances of a few meters to hundreds of meters. The telescopes separated by a hundred meters can be used to obtain images with the spatial resolution approaching that of a 100-meter diameter telescope (approximately 0.75 mas corresponding to 0.13 m at geostationary equatorial orbit (GEO)). When the combination of light from multiple telescopes is coherent, interference fringes are formed in the combined beams. The amplitude and phase of these fringes contain information about the fine-scale structure of the target.

One of the challenges with using an optical/infrared interferometer is the phasing of the different telescopes in the array to coherently combine the light from these telescopes. In order to accurately phase the array, it is necessary to adjust the internal optical paths so that the optical path difference (OPD, the difference between the optical path from target to a beam combiner via one telescope versus the path from the target to the combiner via a second telescope) is zero within an accuracy of a few wavelengths, on a time scale comparable to the coherence time (to) due to atmospheric turbulence. The coherence time may be tens to hundreds of milliseconds, depending on the observing conditions and wavelength. The indication that the array is phased is that interference fringes are produced. To keep the array phased, it is necessary to continue to detect the interference fringes, to use measurements of fringe motion to determine and correct the OPD variations, and to do so within $t_0$. This time limitation imposes a sensitivity limit that is further complicated by each of low target brightness and low fringe amplitudes due to the target structure, particularly for the long baselines (separations between telescopes) that are needed to image target details. This sensitivity limit makes it difficult to build signal strength by integrating the signal over time.

FIGS. 1A through 1D illustrate interference fringes with respect to an interferometer baseline. A baseline may refer to a separation distance between two interferometer array elements 104 and 106. The interferometer array elements 104 and 106 may be two telescopes. A uniform disk 102 may be used as a target to determine fringe amplitudes due to observing the target with a baseline of a given length.

Figure 1A:
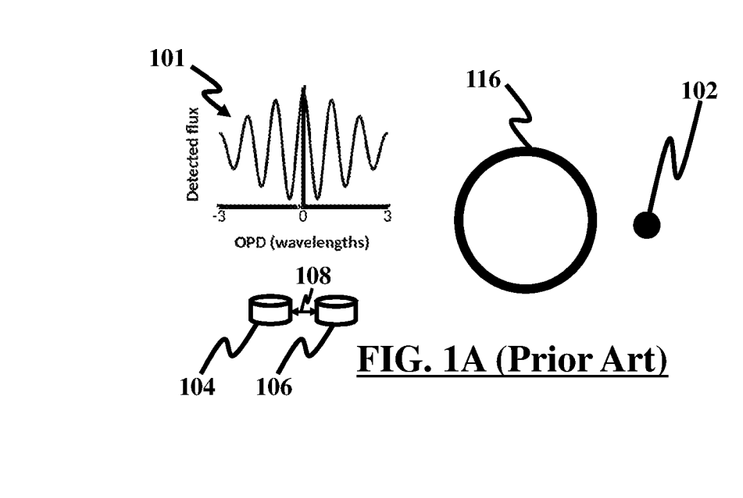
FIG. 1A illustrate detected fringes and resolution in an optical/infrared interferometry system.
Figure 1B:
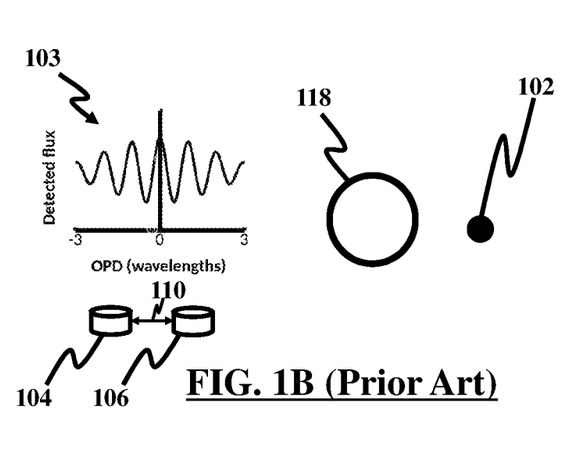
FIG. 1B illustrate detected fringes and resolution in an optical/infrared interferometry system.
Figure 1C:
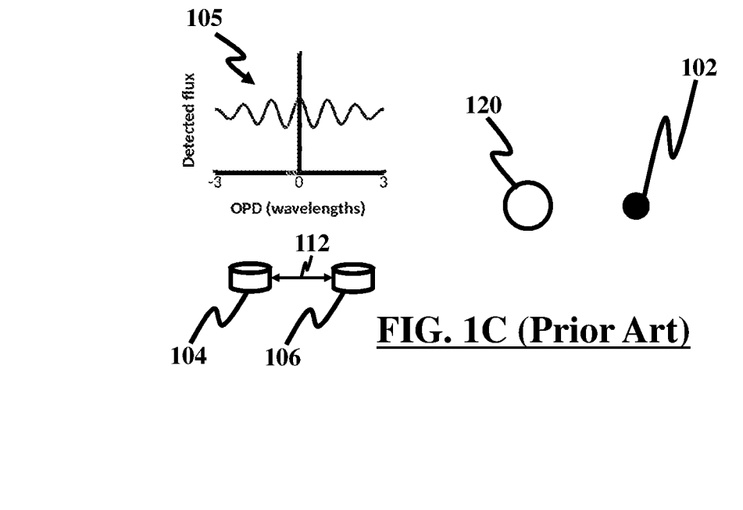
FIG. 1C illustrate detected fringes and resolution in an optical/infrared interferometry system.
Figure 1D:
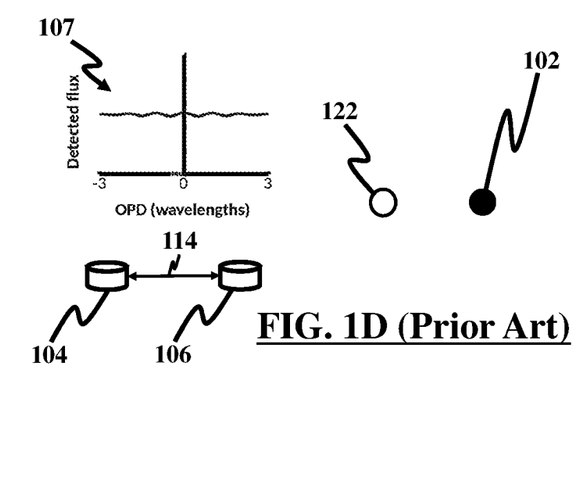
FIG. 1D illustrate detected fringes and resolution in an optical/infrared interferometry system.

A fringe amplitude may refer to a variation in detected flux between bright and dark portions of interference fringes. FIG. 1A illustrates the fringe amplitude versus OPD in a graph 101 for a baseline 108. FIG. 1B illustrates the fringe amplitude in a graph 103 with a baseline 110 that is larger than the baseline 108. FIG. 1C illustrates the fringe amplitude versus OPD in a graph 105 with a baseline 112 that is larger than the baseline 110. FIG. 1D illustrates the fringes in a graph 107 with a baseline 114 that is larger than the baseline 112.

As illustrated in the FIGS. 1A through 1D, as the baseline of the interferometer array elements 104 and 106 increases, lower fringe amplitudes are detected. Longer baselines are important for better resolution of target details. For example, the circle 116 in FIG. 1A illustrates the smallest target detail whose size can be measured by the baseline 108. As illustrated in the FIGS. 1A, 1B, 1C, and 1D, as respectively the baseline lengths increase from baseline 108 to 110 to 112 to 114, the size of the smallest target detail whose size can be measured (circles 116, 118, 120, and 122) decreases, which in turn improves the target resolution. The corresponding fringe amplitudes in graphs 101, 103, 105, and 107 illustrate the amplitudes that result from observing the uniform disk target 102 with the baselines 108, 110, 112, and 114. The baseline 114 in FIG. 1D provides target detail resolution (circle 122) of approximately the same size as the uniform disk target 102, but with small fringe amplitude (graph 107).

Although optical/infrared interferometry has reached resolutions better than 1 mas in observing astronomical targets, conventional optical/infrared interferometers are generally not capable of observing geosats, because they are approximately 10,000 times fainter than astronomical targets of the same apparent size. In addition, the appearance of a geosat is dominated by large-scale structures, leading to low-amplitude interference fringes when observed with long interferometry baselines needed to detect small-scale details. Currently, there is no ground based facility capable of imaging geosats with a resolution better than 25 to 50 mas, which corresponds to dimensions of approximately four to eight meters at the distance of geosats.

SUMMARY

In view of the foregoing, an embodiment herein provides an interferometry system comprising a first telescope configured to simultaneously receive a first signal reflected from a target and a second signal emitted by the target, wherein the first signal comprises any of a first optical signal and a first infrared signal, and the second signal comprises a first radio signal; a second telescope configured to simultaneously receive a third signal reflected from the target and a fourth signal emitted by the target, wherein the third signal comprises any of a second optical signal and a second infrared signal, and the fourth signal comprises a second radio signal; a first beam splitter communicatively connected to the first telescope, wherein the first beam splitter is configured to separate the first signal from the second signal; a second beam splitter communicatively connected to the second telescope, wherein the second beam splitter is configured to separate the third signal from the fourth signal; and a first interferometer configured to detect an interferometry image of the target using the first, second, third, and fourth signals, wherein the first interferometer comprises any of an optical interferometer and an infrared interferometer.

The system may further comprise a second interferometer communicatively connected to the first and second beam splitters, wherein the second interferometer comprises a radio interferometer configured to: receive the second and fourth signals from the first and second beam splitters; correlate the second signal with the fourth signal to determine a phase difference; and determine an optical path difference of the first and third signals using the phase difference of the second signal with the fourth signal. The interferometer may comprise an optical delay lines module communicatively connected to the first and second beam splitters and to the radio interferometer, wherein the optical delay lines module may be configured to receive the first and third signals from the first and second beam splitters and the optical path difference from the second interferometer; determine a first delay and a second delay using the optical path difference; and apply the first delay to the first signal and the second delay to the third signal.

The interferometer may further comprise a beam combiner configured to combine the delayed first and third signals to detect the interferometry image of the target. Any of the first beam splitter and the second beam splitter may comprise a wire grid screen having a fixed separation of a predetermined fraction of a wavelength of the second signal. Any of the first beam splitter and the second beam splitter may comprise a wire grid screen having an adjustable separation of a fraction of a wavelength of the second signal.

The system may further comprise a water vapor radiometer configured to measure a water vapor content along a line of sight of the first and third signals, wherein the water vapor content measurement is used to determine an error in the optical path difference. The target may comprise any of a geostationary satellite and an object in space.

An embodiment herein provides a method for phasing a first interferometer, wherein the first interferometer comprises any of an optical interferometer and an infrared interferometer, the method comprising receiving, by a first telescope, a first signal reflected from a target and a second signal emitted by the target, wherein the first signal comprises any of a first optical signal and a first infrared signal and the second signal comprises a first radio signal; receiving, by a second telescope, a third signal reflected from the target and a fourth signal emitted by the target, wherein the third signal comprises any of a second optical signal and a second infrared signal and the fourth signal comprises a second radio signal; separating, by a first beam splitter communicatively connected to the first telescope, the first signal from the second signal; separating, by a second beam splitter communicatively connected to the second telescope, the third signal from the fourth signal; and detecting, by the first interferometer, an interferometry image of the target using the first, second, third, and fourth signals.

The method may further comprise receiving, by a second interferometer comprising a radio interferometer and communicatively connected to the first and second beam splitters, the second and fourth signals from the first and second beam splitters; correlating, by the second interferometer, the second signal with the fourth signal to determine a phase difference; and determining, by the second interferometer, an optical path difference of the first and third signals using the phase difference of the second signal with the fourth signal.

The method may further comprise receiving, by an optical delay lines module communicatively connected to the first and second beam splitters and to the second interferometer, the first and third signals from the first and second beam splitters and the optical path difference from the second interferometer; determining, by the optical delay lines module, a first delay and a second delay using the optical path difference; and applying, by the optical delay lines module, the first delay to the first signal and the second delay to the third signal.

The method may further comprise combining, by a beam combiner, the delayed first signal and the delayed third signal to detect the interferometry image of the target. Any of the first beam splitter and the second beam splitter may comprise a wire grid screen having a fixed separation of a predetermined fraction of a wavelength of the second signal. Any of the first beam splitter and the second beam splitter may comprise a wire grid screen having an adjustable separation of a fraction of a wavelength of the second signal.

The method may further comprise measuring, by a vapor radiometer, a water vapor content along a line of sight of the first and third signals; and determining an error in the optical path difference, using the water vapor content measurement. The target may comprise any of a geostationary satellite and an object in space.

An embodiment herein provides a system comprising a plurality of telescopes each configured to simultaneously receive a corresponding first signal reflected from a target and a corresponding second signal emitted by the target, wherein the first signal comprises any of an optical signal and an infrared signal; a plurality of beam splitters each communicatively connected to a corresponding telescope of the plurality of telescopes, wherein each of the plurality of beam splitters is configured to separate the corresponding first signal and the corresponding second signal received by the corresponding telescope; and a first interferometer, comprising any of an optical interferometer and an infrared interferometer, and configured to detect an interferometry image of the target using the plurality of corresponding first signals received by the plurality of telescopes and the plurality of corresponding second signals received by the plurality of telescopes.

The system may further comprise a second interferometer communicatively connected to the plurality of beam splitters, the second interferometer may comprise a radio interferometer configured to receive the plurality of corresponding second signals from the plurality of beam splitters; correlate the plurality of corresponding second signals to determine a plurality of phase differences; and determine a plurality of optical path differences corresponding to the plurality of telescopes using the plurality of phase differences of the plurality of corresponding second signals.

The first interferometer may comprise an optical delay lines module communicatively connected to the plurality of beam splitters and to the second interferometer, wherein the optical delay lines module is configured to receive the plurality of corresponding first signals from the plurality of beam splitters and the plurality of optical path differences from the second interferometer; determine a plurality of delays using the plurality of optical path differences; and apply the plurality of delays to the plurality of corresponding first signals.

The system may further comprise a water vapor radiometer configured to measure a water vapor content along a line of sight of the plurality of corresponding first signals, wherein the water vapor content measurement may be used to determine an error in the plurality of optical path differences. The first interferometer may further comprise a beam combiner configured to combine the delayed plurality of corresponding first signals to detect the interferometry image of the target. Any of the plurality of splitters may comprise a wire grid screen having a fixed separation of a predetermined fraction of a wavelength of the corresponding second signal. The target may comprise any of a geostationary satellite and an object in space.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

An embodiment herein provides a technique to phase an optical or infrared interferometer composed of two or more optical or infrared telescopes. The optical or infrared interferometer may be used to observe a geostationary satellite (geosat), or other objects in space, by receiving reflected light or infrared signal, and also passively detecting the radio communications signal from the geosat. This technique circumvents the limitations of direct optical detection of an interference fringe signal resulting from the short timescales of atmospheric turbulence, the faintness of the targets, or the low signal amplitudes, on long baselines (separation distance between telescopes), that characterize the details of the targets.

The embodiments herein use the determination of OPD in the radio regime and allow for the blind integration by an optical or infrared interferometer. Consequently, the embodiments herein provide for the reduction in the number of telescopes needed to detect the object, and therefore reduce the complexity of the optical backend.

An embodiment herein determines OPD based on the communications signal from the satellite in the radio frequency range. This method will allow for longer integration times at optical or infrared wavelengths on baselines for which there is not enough signal to track fringes directly. This is a passive method that circumvents the issues imposed by the faintness and dimensions of the geostationary satellites.

An embodiment herein uses the fact that satellites generally transmit in the frequency range of a few GHz (wavelengths of millimeters to centimeters) and this signal is perturbed in the same way the optical/infrared light is affected. The radio waves and optical/infrared radiation are delayed by atmospheric turbulence. Although the index of refraction of air is different in the radio and optical/infrared wavelength regimes, the variation with wavelength is a well-determined function of air density and water vapor content. Either by employing a dry site or using an additional measurement to determine changes in water vapor, the OPD measurements at radio wavelengths can be converted to OPD in the optical and infrared. Other effects such as motion of the telescope can be measured and uncertainties in the satellite's orbital motion produce slow variations of OPD that can be determined using the received radio signals.

Figure 2:
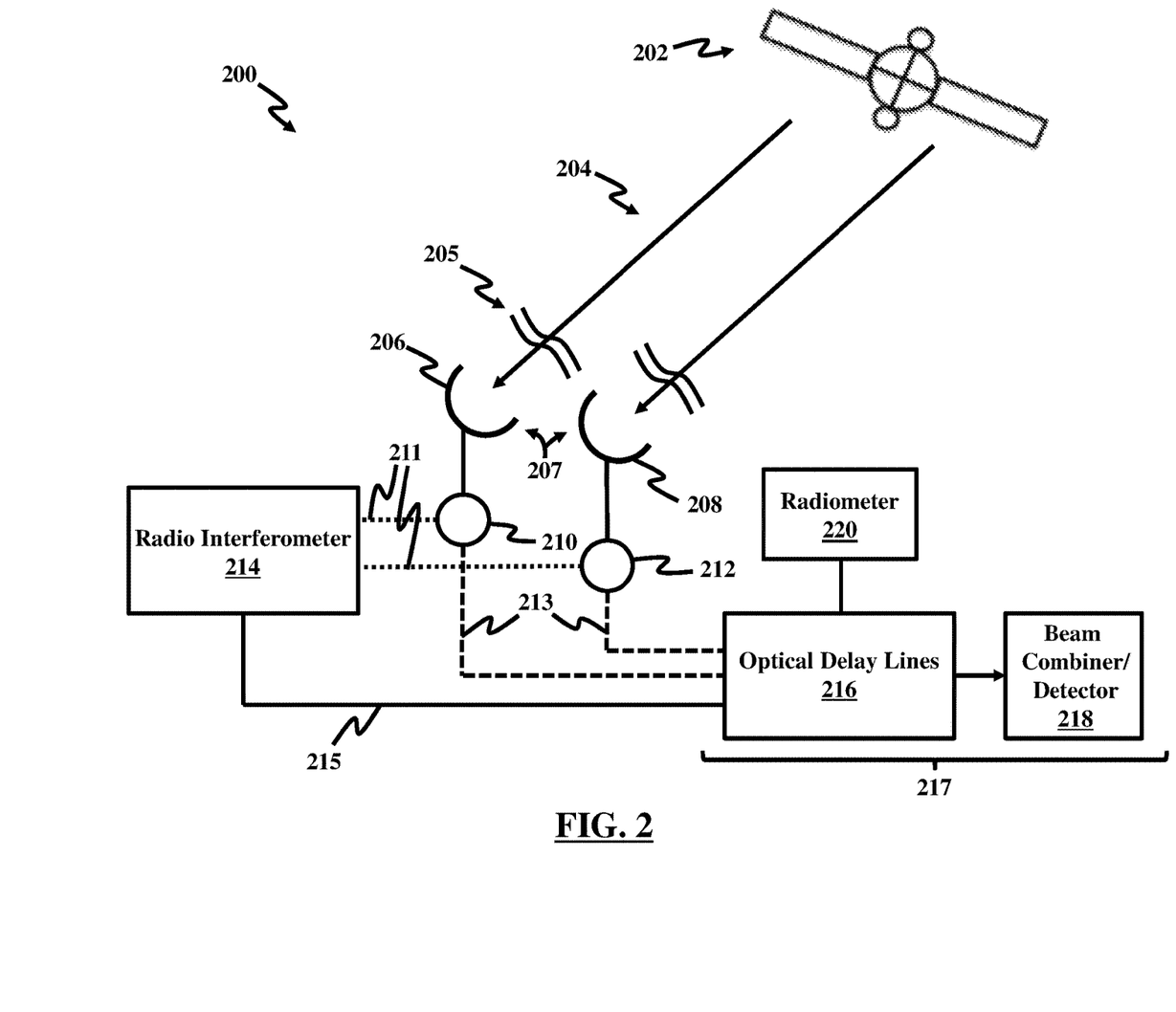
FIG. 2 is a schematic diagram illustrating a system for phasing an optical/infrared interferometer using radio emission from a target according to an embodiment herein.
Figure 3:
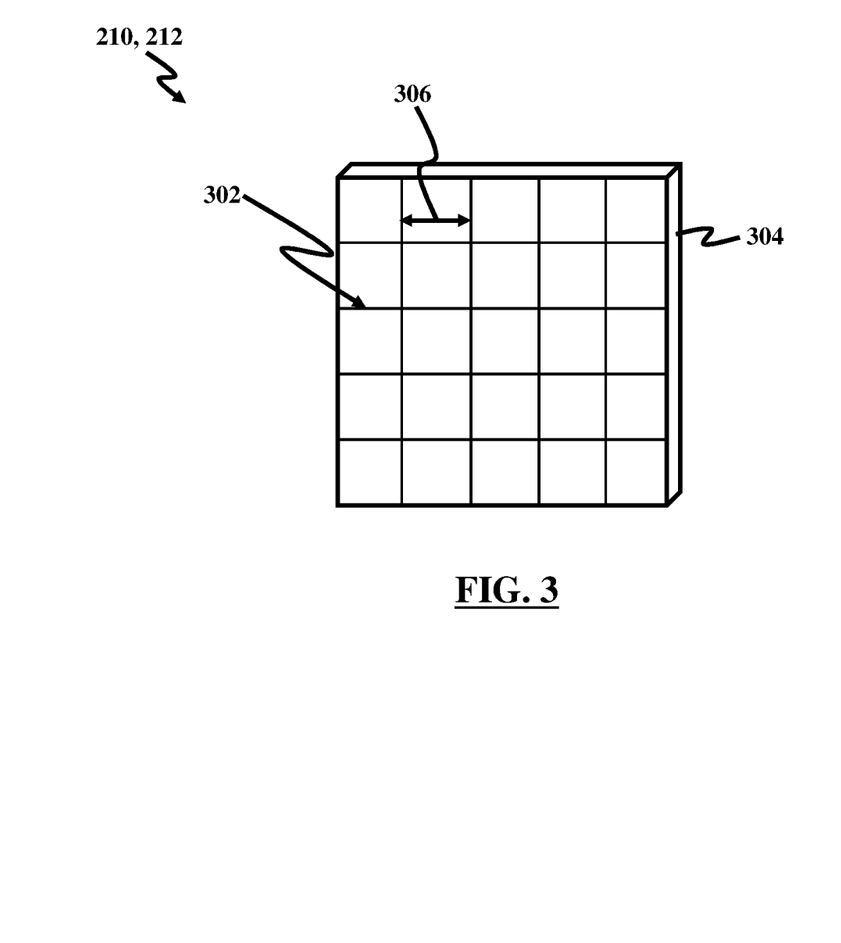
FIG. 3 is a schematic diagram illustrating a beam splitter according to an exemplary embodiment herein.
Figure 4:
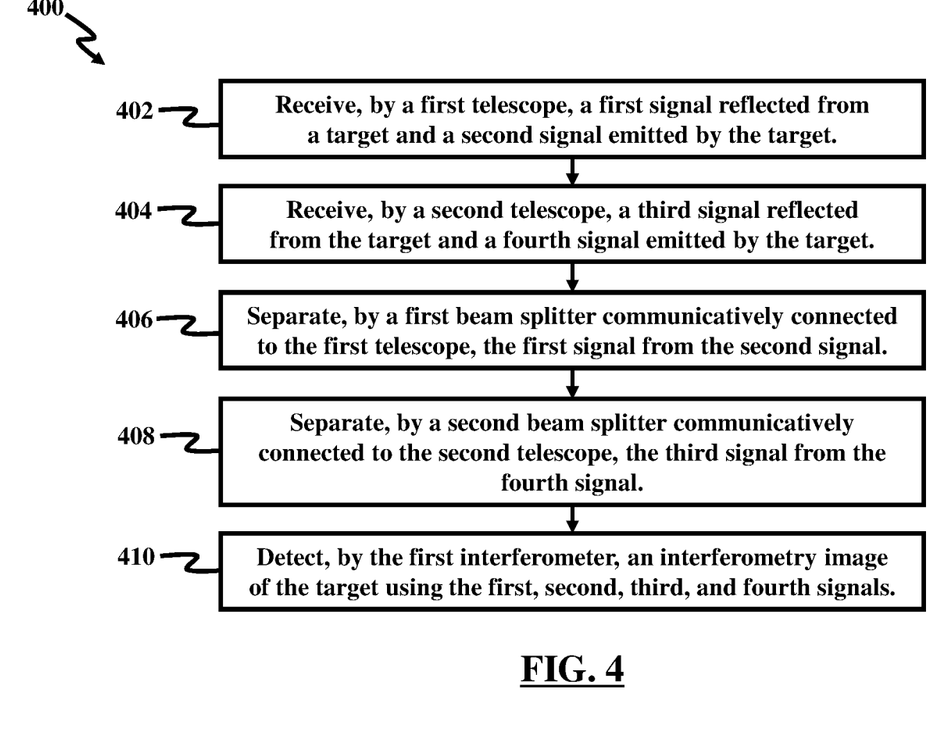
FIG. 4 is a flow diagram illustrating a method according to an embodiment herein.

An embodiment herein circumvents the long-baseline fringe-detection limitation by using radio signals, rather than using only optical or infrared light from the telescopes, to determine the delays needed to produce fringes. Referring now to the drawings, and more particularly to FIGS. 2 through 4, where similar reference characters denote corresponding features consistently throughout the figures, there are shown exemplary embodiments.

FIG. 2 is a schematic diagram illustrating a system 200 according to an embodiment herein. The system 200 includes a plurality of telescopes 206, 208 configured as an interferometer input array 207 for observing a geostationary satellite 202. Reflected light/infrared and radio communications signals 204 from the satellite 202 travel the same distance, cross similar paths through the atmosphere, and are disturbed by atmospheric turbulence effects 205 in a similar way before they reach telescopes 206, 208 in the interferometer array 207. Therefore, the reflected light/infrared and radio communication signals 204 follow a common path before they are received by the telescopes 206 and 208.

In an embodiment herein, the signals 204 are received by both of the telescopes 206, 208 and pass through beam splitters 210, 212, which separate the optical/infrared from the radio part of the signals 204. After passing through the beam splitters 210, 212, the radio signal portion of the signals 204 is reflected to a radio interferometer 214 on free space paths 211. The radio interferometer 214 correlates the radio signals received by the telescopes 206, 208. The correlation determines the phase difference between the radio signals travelling from the satellite 202 to the telescopes 206, 208. Using the phase difference, the radio interferometer 214 determines the OPD by converting phase to distance, using the known travel speed of radio signals.

In an embodiment herein, after passing through the beam splitters 210, 212, the optical/infrared signal portion of the signals 204 is sent to an optical/infrared interferometer 217 on connections 213. In an exemplary embodiment herein, the connections 213 may include any of fiber optics and free space connections using reflective mirrors.

In an embodiment herein, the optical/infrared interferometer 217 may include optical delay lines module 216 and a beam combiner/detector 218. The optical/infrared signals are sent through the connections 213 to the optical delay lines 216. The OPD information is also sent to the optical delay line module 216 using connection 215. In an exemplary embodiment herein, the connection 215 may include any electronic data connection. The received OPD information is used by the optical delay lines module 216 to determine appropriate delays for compensating the OPD. After the optical/infrared signals are properly delayed by the optical delay lines module 216 to compensate for the OPD, the beam combiner/detector 218 combines the optical/infrared signals to create the interference that depicts the image of the satellite 202.

The beam splitters 210, 212 may use any method capable of separating the optical/infrared from the radio signals. FIG. 3, with reference to FIG. 2, is a schematic diagram illustrating any of beam splitter 210 or 212. The beam splitter 210, 212 may include a thin wire grid screen 302 made of an electromagnetic reflective material. The grid screen 302 is configured to reflect a portion of radio signals, but to transmit the optical/infrared signals. In an embodiment herein, approximately 50% of the incident radio radiation of a radio signal with a wavelength of $\lambda_R$ is reflected, when the separation 306 of the openings of the wire grid screen 302 is approximately $\lambda_R/4$ (for example, grid separation of 7.5 mm for $\lambda_R$=3 cm), and approximately 90% of the radio radiation is reflected when the separation 306 is $\lambda_R/12$.

The wire grid screen 302, having separation 306 within an order of magnitude of the radio signal wavelength $\lambda_R$, allows optical/infrared radiation to be transmitted with a negligible loss, because optical/infrared wavelengths are significantly smaller than $\lambda_R$. In an embodiment herein, the separation 306 may be any of a fixed and adjustable separation.

In an embodiment herein, the wire grid screen 302 may be free standing when the wires are thick enough to make a free standing structure possible. In an embodiment herein, the wire grid screen 302 may include thin wires deposited on top of an optical component 304, such as a glass plate. The optical component 304 is configured to pass the optical/infrared signals through, and may work as a structural support for the grid screen 302. In an embodiment herein, the wire grid screen 302 may have any other opening shape other than the squared shape illustrated in FIG. 3, for example any of circular, oval, and rectangular.

In the embodiment herein, radio frequencies higher than 1 GHz ($\lambda_R$<30 cm) may be used, while frequencies higher than 5 GHz are preferred (which are the frequencies commonly used for communications). At radio frequencies higher than 5 GHz, the ionosphere will add an extra delay to the radio signal compared to the optical/infrared signal. However, this extra delay is of the order of a few nanoseconds, much less than the typical integration time delay of a few micro seconds needed to determine the OPD. When using observations in the radio frequencies to determine the optical path difference at a shorter wavelength than 30 cm, another factor to consider is the difference in air refractivity.

Air refractivity depends on temperature and pressure in a similar way for radio and optical/infrared wavelengths. Water vapor has a negligible effect in the optical/infrared signal, but at radio frequencies the air refractivity increases by approximately 6% in a temperature of approximately 288 Kelvin and relative humidity of 20%. These effects can be taken under consideration using environmental measurements. A temperature error of 1K may result in an optical path error less than 500 nm for relative humidity of 80%. In the embodiments herein, water vapor effects may be mitigated by placing the telescopes 206 and 208 in a dry site, or using a water vapor radiometer 220 to measure the water vapor content along the line of sight. The water vapor content measurement is then used by the optical delay lines module 216 to determine an error in the optical path difference, and adjust the delay values for compensating the OPD to also compensate for the error due to water vapor.

An embodiment herein takes into consideration the precision needed to measure phase variations in the radio regime in order to stabilize the OPD to a variation smaller than $n\lambda$ in the optical domain, where $\lambda$ is the optical/infrared wavelength of interest and n is an integer indicating the number of wavelengths. In an exemplary embodiment herein, it is assumed that n=5, and that the shortest wavelength observed in the optical domain is $\lambda$=600 nm, corresponding to a maximum difference between radio and optical OPD smaller than 3 µm. This level of stabilization allows the use of post processing techniques to further correct the optical OPD and average a large number of samples to improve the final signal to noise ratio (SNR) of the optical/infrared interference fringes.

For example, when the satellite 202 transmits radio signals at 10 GHz (at a wavelength of 3 cm), in order to have an OPD difference less than 3 m, the radio interferometer should be able to measure phase variations less than 0.036 degrees (phase $\varnothing=2\pi OPD/\lambda=6.3\times10^4$ radians). This will require detecting the radio interference fringe with a SNR of approximately 1600 per integration. To calculate whether this SNR can be reached, an embodiment herein first performs an estimate of the radiation from a geosat that reaches the earth. An assumption is that the satellite 202 is located at a distance of $4\times10^7$ m, transmitting 2 W with a bandwidth of 100 kHz. For a beam of 0.1 steradian, each telescope will detect $6.3\times10^{-20}$ Wm$^{-2}$Hz$^{-1}$.

The sensitivity of a single baseline composed of two telescopes 206, 208 with diameters of 1.5 m, observing at 10 GHz, can be calculated using sensitivity calculations for the Very Large Array (VLA) and scaling the area of a VLA antenna (25 m diameter) relative to the area of optical telescopes 206 and 208 (1.5 m diameter). The embodiments herein use integration times of $t_{int}$=0.01 sec. It is observed that the baseline noise is $5.3\times20^{-24}$ Wm$^{-2}$HZ$^{-1}$, which will result in an SNR of approximately 2350 per integration time, which is enough to maintain the OPD error less than 3 µm.

FIG. 4, with reference to FIGS. 2 through 3, is a flow diagram illustrating a method 400 for phasing a first interferometer 217, wherein the first interferometer 217 includes any of an optical interferometer and an infrared interferometer, according to an embodiment herein. At step 402, the method 400 may receive, by a first telescope 206, a first signal reflected from a target 202 and a second signal emitted by the target 202, wherein the first signal includes any of a first optical signal and a first infrared signal and the second signal includes a first radio signal. At step 404, the method 400 may receive, by a second telescope 208, a third signal reflected from the target 202 and a fourth signal emitted by the target 202, wherein the third signal includes any of a second optical signal and a second infrared signal and the fourth signal includes a second radio signal. At step 406, the method 400 may separate, by a first beam splitter 210 communicatively connected to the first telescope 202, the first signal from the second signal. At step 408, the method 400 may separate, by a second beam splitter 212 communicatively connected to the second telescope 208, the third signal from the fourth signal. At step 410, the method 400 may detect, by the first interferometer 217, an interferometry image of the target using the first, second, third, and fourth signals.

The embodiments herein provide systems and methods for phasing of an optical/infrared interferometer for detecting a faint target. The embodiments herein may be used in the interferometric imaging of geostationary satellites, as well as for other objects in space.

The embodiments herein provide optical path difference correction between different interferometer telescopes without the direct detection of interference fringes at optical/infrared wavelengths, thus circumventing a major sensitivity limitation in the imaging of geosats. The embodiments herein further provide increased integration times at optical/infrared wavelengths, allowing for the detection of interferometric fringes which would have been otherwise too faint to detect within an atmospheric coherence time. The embodiments herein also make observations with longer baselines possible, without the need to use a chain of several telescopes to bootstrap the OPD from short baselines to longer ones. Longer baselines translate into larger spatial frequencies and higher resolution images.

The embodiments herein use a radio communications signal from a satellite to stabilize the optical path difference between two telescopes 206, 208 at a level of $n\lambda$, where $\lambda$ is the optical wavelength of interest and n is the number of wavelengths. In an exemplary embodiment, n=5, which would require the stabilization of the optical path difference to approximately 3 m when observing at a wavelength of 600 nm.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. An interferometry system comprising:
a first telescope configured to simultaneously receive a first signal reflected from a target and a second signal emitted by the target, wherein the first signal comprises any of a first optical signal and a first infrared signal, and the second signal comprises a first radio signal;
a second telescope configured to simultaneously receive a third signal reflected from the target and a fourth signal emitted by the target, wherein the third signal comprises any of a second optical signal and a second infrared signal, and the fourth signal comprises a second radio signal;
a first beam splitter communicatively connected to the first telescope, wherein the first beam splitter is configured to separate the first signal from the second signal;
a second beam splitter communicatively connected to the second telescope, wherein the second beam splitter is configured to separate the third signal from the fourth signal;
a first interferometer configured to combine the first and third signals to detect an interferometry image of the target, wherein an optical path difference is used by the first interferometer to combine the first and third signals, and wherein the first interferometer comprises any of an optical interferometer and an infrared interferometer; and
a second interferometer communicatively connected to the first and second beam splitters, wherein the second interferometer comprises a radio interferometer configured to:
receive the second and fourth signals from the first and second beam splitters,
correlate the second signal with the fourth signal to determine a phase difference, and
determine the optical path difference of the first and third signals using the phase difference of the second signal with the fourth signal.

2. The system of claim 1, wherein the first interferometer comprises an optical delay lines module communicatively connected to the first and second beam splitters and to the radio interferometer, wherein the optical delay lines module is configured to:
receive the first and third signals from the first and second beam splitters and the optical path difference from the second interferometer;
determine a first delay and a second delay using the optical path difference; and
apply the first delay to the first signal and the second delay to the third signal.

3. The system of claim 2, wherein the first interferometer further comprises a beam combiner configured to combine the delayed first and third signals.

4. The system of claim 3, wherein any of the first beam splitter and the second beam splitter comprises a wire grid screen having a fixed separation of a predetermined fraction of a wavelength of the second signal.

5. The system of claim 3, wherein any of the first beam splitter and the second beam splitter comprises a wire grid screen having an adjustable separation of a fraction of a wavelength of the second signal.

6. The system of claim 3, further comprising a water vapor radiometer configured to measure a water vapor content along a line of sight of the first and third signals, wherein the optical delay lines module is further configured to use the water vapor content measurement to determine an error in the optical path difference.

7. An interferometry system comprising:
a plurality of telescopes each configured to simultaneously receive a corresponding first signal reflected from a target and a corresponding second signal emitted by the target, wherein the first signal comprises any of an optical signal and an infrared signal, and wherein the corresponding second signal comprises a corresponding radio signal;
a plurality of beam splitters each communicatively connected to a corresponding telescope of the plurality of telescopes, wherein each of the plurality of beam splitters is configured to separate the corresponding first signal from the corresponding second signal received by the corresponding telescope;
a first interferometer comprising any of an optical interferometer and an infrared interferometer and configured to combine the plurality of corresponding first signals received by the plurality of telescopes to detect an interferometry image of the target, wherein a plurality of optical path differences are used by the first interferometer to combine the plurality of corresponding first signals; and
a second interferometer communicatively connected to the plurality of beam splitters, the second interferometer comprising a radio interferometer configured to:
receive the plurality of corresponding second signals from the plurality of beam splitters;
correlate the plurality of corresponding second signals to determine a plurality of phase differences; and
determine a plurality of optical path differences corresponding to the plurality of telescopes using the plurality of phase differences of the plurality of corresponding second signals.

8. The system of claim 7, wherein the first interferometer comprises an optical delay lines module communicatively connected to the plurality of beam splitters and to the second interferometer, wherein the optical delay lines module is configured to:
receive the plurality of corresponding first signals from the plurality of beam splitters and the plurality of optical path differences from the second interferometer;
determine a plurality of delays using the plurality of optical path differences; and
apply the plurality of delays to the plurality of corresponding first signals.

9. The system of claim 8, further comprising a water vapor radiometer configured to measure a water vapor content along a line of sight of the plurality of corresponding first signals, wherein the optical delay lines module is further configured to use the water vapor content measurement to determine an error in the plurality of optical path differences.

10. The system of claim 8, wherein the first interferometer further comprises a beam combiner configured to combine the delayed plurality of corresponding first signals.

11. The system of claim 8, wherein any of the plurality of splitters comprises a wire grid screen having a fixed separation of a predetermined fraction of a wavelength of the corresponding second signal.

12. A method for phasing an interferometer comprising any of an optical interferometer and an infrared interferometer, the method comprising:
receiving a first signal reflected from a target and a second signal emitted by the target, wherein the first signal comprises any of a first optical signal and a first infrared signal and the second signal comprises a first radio signal;
receiving a third signal reflected from the target and a fourth signal emitted by the target, wherein the third signal comprises any of a second optical signal and a second infrared signal and the fourth signal comprises a second radio signal;
separating the first signal from the second signal;
separating the third signal from the fourth signal;
combining the first and third to detect an interferometry image of the target
receiving the second and fourth signals;
correlating the second signal with the fourth signal to determine a phase difference; and
determining an optical path difference of the first and third signals using the phase difference of the second signal with the fourth signal.

13. The method of claim 12, further comprising: receiving the first and third signals and the optical path difference; determining a first delay and a second delay using the optical path difference; and applying the first delay to the first signal and the second delay to the third signal.

14. The method of claim 13, further comprising combining the delayed first signal and the delayed third signal to detect the interferometry image of the target.

15. The method of claim 14, further comprising:
measuring a water vapor content along a line of sight of the first and third signals; and
determining an error in the optical path difference using the water vapor content measurement.

* * * * *